(12) United States Patent
Kazami et al.

(10) Patent No.: US 7,793,354 B2
(45) Date of Patent: Sep. 7, 2010

(54) SYSTEM, METHOD, AND COMPUTER PROGRAM FOR VERIFYING DATA ON INFORMATION RECORDING MEDIUM

(75) Inventors: Shinichi Kazami, Kanagawa (JP); Kazuyoshi Takahashi, Tokyo (JP)

(73) Assignee: Sony Corporation, Tokyo (JP)

( * ) Notice: Subject to any disclaimer, the term of this patent is extended or adjusted under 35 U.S.C. 154(b) by 1271 days.

(21) Appl. No.: 11/155,506

(22) Filed: Jun. 20, 2005

(65) Prior Publication Data

US 2005/0286379 A1    Dec. 29, 2005

(30) Foreign Application Priority Data

Jun. 24, 2004    (JP) .............. 2004-185897

(51) Int. Cl.
G06F 7/04      (2006.01)
G11B 5/86      (2006.01)
G11B 3/64      (2006.01)
G11B 7/28      (2006.01)

(52) U.S. Cl. ............... 726/32; 369/47.12; 369/84
(58) Field of Classification Search ............... 726/32; 369/47.12, 84
See application file for complete search history.

(56) References Cited

U.S. PATENT DOCUMENTS

| | | | |
|---|---|---|---|
| 6,782,190 B1* | 8/2004 | Morito | 386/94 |
| 6,957,343 B2* | 10/2005 | Ripley et al. | 713/193 |
| 7,110,544 B2* | 9/2006 | Gotoh et al. | 380/203 |
| 7,380,134 B2* | 5/2008 | Yamada | 713/193 |
| 7,464,411 B2* | 12/2008 | Heylen | 726/30 |
| 7,477,577 B2* | 1/2009 | Alumbaugh et al. | 369/47.1 |
| RE41,032 E * | 12/2009 | Oshima et al. | 726/26 |
| 2002/0141576 A1* | 10/2002 | Ripley et al. | 380/201 |
| 2005/0025024 A1* | 2/2005 | Alumbaugh et al. | 369/84 |

FOREIGN PATENT DOCUMENTS

| | | |
|---|---|---|
| JP | 2002-288887 | 10/2002 |
| WO | WO 03/088055 | 10/2003 |

* cited by examiner

Primary Examiner—Christian LaForgia
(74) Attorney, Agent, or Firm—Oblon, Spivak, McClelland, Maier & Neustadt, L.L.P.

(57) ABSTRACT

The present invention relates to a system for verifying data recorded on an information recording medium. The system includes a data reproduction unit for reproducing data recorded on an information recording medium, a reproduction-verification-data generation unit for executing a calculation based on the data reproduced by the data reproduction unit to generate reproduction verification data, and a data comparison unit for comparing the reproduction verification data with recording verification data, which is obtained by executing a calculation based on data to be recorded on the information recording medium.

11 Claims, 4 Drawing Sheets

SYSTEM, METHOD, AND COMPUTER PROGRAM FOR VERIFYING DATA ON INFORMATION RECORDING MEDIUM

CROSS REFERENCES TO RELATED APPLICATIONS

The present invention contains subject matter related to Japanese Patent Application JP 2004-185897 filed in the Japanese Patent Office on Jun. 24, 2004, the entire contents of which are incorporated herein by reference.

BACKGROUND OF THE INVENTION

1. Field of the Invention

The present invention relates to a system, method, and computer program for verifying data recorded on an information recording medium. More particularly, the invention relates to a system, method, and computer program for verifying information with reliability while retaining a high level of security, the information including content to be copyright-protected and a cipher key, which are stored in an information recording medium and have to be prevented from being leaked.

2. Description of the Related Art

Software data (hereinafter, referred to as content), e.g., audio data such as a music track, image data such as a movie, a game program, or an application program can be stored as digital data in a recording medium such as a Blu-ray Disc using a blue laser, a digital versatile disc (DVD), a Mini-Disc (MD), or a compact disc (CD). In particular, a Blu-ray Disc is capable of recording at high density. Large-capacity video content can be recorded as high-quality data on a Blu-ray Disc.

Digital content stored in various information recording media are distributed to users. The user uses a personal computer (PC) or a playback unit such as a disc player to play back or use the content.

In general, the rights of many pieces of content, such as music data items and image data items, are possessed by their authors or distributors, respectively. In distributing content, usually, the use of the content is restricted, i.e., permission for the use thereof is given to only authorized users so as to prevent unauthorized copying.

In digital recording apparatuses and recording media, data such as image data and audio data can be repeatedly recorded and reproduced without being deteriorated. Unfortunately, the following problems often occur: Unauthorized copies of content are distributed over the Internet; CD-Rs including unauthorized copies of content, i.e., pirated discs, are distributed; and content is stored in hard disks of PCs of unauthorized users without permission, and the copied content is illegally used.

DVDs and large-capacity recording media using blue lasers, which are being developed, are capable of storing a large amount of data corresponding to one or more movies as digital information. As it becomes possible to record image information as digital information, the challenge to prevent unauthorized copying to protect copyright holders becomes more important. To prevent unauthorized copying of digital data, various technologies for preventing illegal copying are in practical use in digital recording apparatuses and recording media.

In manufacturing information recording media, such as CDs or DVDs, each storing content, a plurality of entities, such as a content owner, a content editor, a disc manufacturer, and a key management center (Key Issuing Center: KIC) for managing and issuing keys for encryption, provide necessary information, and the information is distributed and verified between the entities to produce recording information media.

For instance, a disc producing entity serving as a disc production plant verifies data provided by the content editor to execute a process of recording data on each disc. In addition, the disc producing entity performs a verification process of checking whether data recorded on each disc matches the data to be recorded. This process is executed based on a checking process of comparing data reproduced from each recorded disc with the data to be recorded. In the above-mentioned data verification process, reproduced data to be verified may be leaked. If data leakage occurs, the profits of the content right holder may be lost.

Typical disc production and data verification will now be described with reference to FIG. 1. FIG. 1 shows a key management center (Key Issuing Center: KIC) 101 for executing a process of managing and issuing keys, a content editing entity 102, such as a studio, for executing a content editing process, and a recording medium producing entity 110 serving as a disc production plant. The recording medium producing entity 110 receives a cipher key issued by the key management center 101 and cipher-key related information, such as key generation information, from the key management center 101. In addition, the recording medium producing entity 110 receives edited content to be recorded on a disc and content-related information from the content editing entity 102.

In the recording medium producing entity 110, a data generation unit (Formatter) 111 executes a process of recording the cipher key and the cipher-key related information received from the key management center 101 and the edited content received from the content editing entity 102 on an information recording medium (Disc) 112 in a predetermined format. At that time, as necessary, the data generation unit 111 executes a process of encrypting the content using the cipher key received from the key management center 101 and records encrypted data on the information recording medium 112.

The content and various cipher key information items are recorded on each information recording medium. Subsequently, the recording medium producing entity 110 executes a verification process of checking whether data recorded on the information recording medium 112 is valid. All recorded discs or sampled discs are subjected to the verification process.

The verification process is performed such that data reproduced by a data reproduction unit (Drive) 113 and data output by the data generation unit 111, i.e., two data streams, are supplied to a recording medium verification unit 114 (Disc Checker) 114 to compare the two data streams.

In executing the verification process, content data and cipher key information, which have to be prevented from being leaked, are transferred as data to be compared in a data path between the data generation unit 111 and the recording medium verification unit 114 and that between the data reproduction unit 113 and the recording medium verification unit 114. If data is leaked from any data path by interception, the profits of the content right holder may be lost.

SUMMARY OF THE INVENTION

According to the present invention, in consideration of the above circumstances, it is desirable to provide a system, method, and computer program for securely verifying data recorded on an information recording medium with reliability, the data verification being executed in producing information recording media storing various content, which have to be securely managed in terms of copyright.

According to an embodiment of the present invention, there is provided a system for verifying data recorded on an information recording medium. The system includes the following elements. A data reproduction unit reproduces data recorded on the information recording medium. A reproduction-verification-data generation unit executes a calculation based on the data, reproduced by the data reproduction unit, to generate reproduction verification data. A data comparison unit for comparing the reproduction verification data with recording verification data, which is obtained by executing a calculation based on data to be recorded on the information recording medium.

According to this embodiment of the present invention, the reproduction-verification-data generation unit executes a calculation of applying a one-way function to the data reproduced from the information recording medium to output a result of the calculation as reproduction verification data to the data comparison unit. The data comparison unit compares the reproduction verification data generated by the reproduction-verification-data generation unit with recording verification data serving as a result of a calculation of applying the one-way function to the data to be recorded on the information recording medium.

According to this embodiment of the present invention, the data reproduction unit outputs encrypted data stored in the information recording medium to the reproduction-verification-data generation unit. The reproduction-verification-data generation unit executes a calculation of applying a one-way function to the encrypted data to output a result of the calculation as reproduction verification data to the data comparison unit. The data comparison unit compares the reproduction verification data generated by the reproduction-verification-data generation unit with recording verification data, which serves as a result of a calculation of applying the one-way function to encrypted data included in the data to be recorded on the information recording medium.

According to this embodiment of the present invention, the data reproduction unit further includes a data decryption unit for decrypting encrypted data included in the data reproduced from the information recording medium. The data reproduction unit outputs unencrypted data, which is decrypted by the data decryption unit, to the reproduction-verification-data generation unit. The reproduction-verification-data generation unit executes a calculation of applying a one-way function to the unencrypted data to output a result of the calculation as reproduction verification data to the data comparison unit. The data comparison unit compares the reproduction verification data generated by the reproduction-verification-data generation unit with recording verification data serving as a result of a calculation of applying the one-way function to unencrypted data, which is original data to be recorded on the information recording medium.

According to this embodiment of the present invention, the reproduction-verification-data generation unit calculates a message digest code (MDC) based on the data reproduced by the data reproduction unit. The data comparison unit compares the message digest code (MDC) generated by the reproduction-verification-data generation unit with a message digest code (MDC) based on the data to be recorded on the information recording medium.

According to this embodiment of the present invention, the data reproduction unit reproduces data, including encrypted content and key information, from the information recording medium. The data comparison unit verifies the content and the key information on the basis of verification data as a result of a calculation based on the encrypted content or decrypted content and verification data as a result of a calculation based on the key information.

According to another embodiment of the present invention, there is provided a method for verifying data recorded on an information recording medium. The method includes the steps of reproducing data recorded on the information recording medium, executing a calculation based on the reproduced data to generate reproduction verification data, and comparing the reproduction verification data with recording verification data, which is obtained by executing a calculation based on data to be recorded on the information recording medium.

According to this embodiment of the present invention, a calculation of applying a one-way function to the data reproduced from the information recording medium is executed to generate reproduction verification data as a result of the calculation, and the generated reproduction verification data is compared to recording verification data serving as a result of a calculation of applying the one-way function to the data to be recorded on the information recording medium.

According to this embodiment of the present invention, encrypted data stored in the information recording medium is reproduced and is output. A calculation of applying a one-way function to the encrypted data is executed to generate reproduction verification data as a result of the calculation. The generated reproduction verification data is compared to recording verification data, which serves as a result of a calculation of applying the one-way function to encrypted data included in the data to be recorded on the information recording medium.

According to this embodiment of the present invention, the method further includes a step of decrypting encrypted data included in the data reproduced from the information recording medium to generate unencrypted data. A calculation of applying a one-way function to the unencrypted data is executed to generate reproduction verification data as a result of the calculation. The generated reproduction verification data is compared to recording verification data serving as a result of a calculation of applying the one-way function to unencrypted data, which is original data to be recorded on the information recording medium.

According to this embodiment of the present invention, a message digest code (MDC) is calculated based on the reproduced data. The message digest code (MDC) is compared to a message digest code (MDC) based on the data to be recorded on the information recording medium.

According to this embodiment of the present invention, data including encrypted content and key information is reproduced from the information recording medium. The content and the key information are verified on the basis of verification data as a result of a calculation based on the encrypted content or decrypted content and verification data as a result of a calculation based on the key information.

According to still another embodiment of the present invention, there is provided a computer program for verifying data recorded on an information recording medium. The computer program includes the steps of reproducing data recorded on the information recording medium, executing a calculation based on the reproduced data to generate reproduction verification data, and comparing the reproduction verification data with recording verification data, which is obtained by executing a calculation based on data to be recorded on the information recording medium.

The computer program according to this embodiment of the present invention can be provided to, e.g., a computer system capable of executing various program codes through a computer-readable recording medium, such as a CD, an FD, or an MO, or via a communication medium, e.g., a network. The program is provided in a computer-readable format, so that a process according to the program can be executed on the computer system.

Other features and advantages of the present invention will become more apparent from the following description of the preferred embodiments of the invention in conjunction with the accompanying drawings. In the present specification, a system is a logical set of units. It is not necessarily that the units are included in the same casing.

According to the embodiment of the present invention, data is reproduced from an information recording medium, a calculation based on the reproduced data is executed to generate reproduction verification data, and the generated data is supplied to the data comparison unit. In the data comparison unit, the reproduction verification data is compared to recording verification data, which serves as a result of a calculation based on data to be recorded on the information recording medium. Consequently, data, which is obtained by a calculation and is different from content or key information, can be used as verification data to be supplied to the data comparison unit. If verification data is leaked, the leakage of real data such as content or key information can be prevented.

According to the embodiment of the present invention, verification data, which is supplied to the data comparison unit, includes not content and key information but digest values calculated based on the content and the key information, i.e., MDCs (message digest codes). If MDC data is leaked, the content and the key information are not leaked. Therefore, there is no risk of leakage of data to be secured. Data can be verified in a high security environment.

DESCRIPTION OF THE PREFERRED EMBODIMENTS

A system, method, and computer program for verifying data on an information recording medium will now be described in detail with reference to the drawings.

A process of producing an information recording medium will now be described in brief. In an embodiment, which will be described below, a disc-shaped recording medium will be described as an example of the information recording medium. Information recording media to which the present invention can be applied are not limited to disc-shaped recording media. The media include various information recording media, such as an optical recording medium, a magnetic recording medium, a semiconductor recording medium, and a flash memory.

Figure 1:
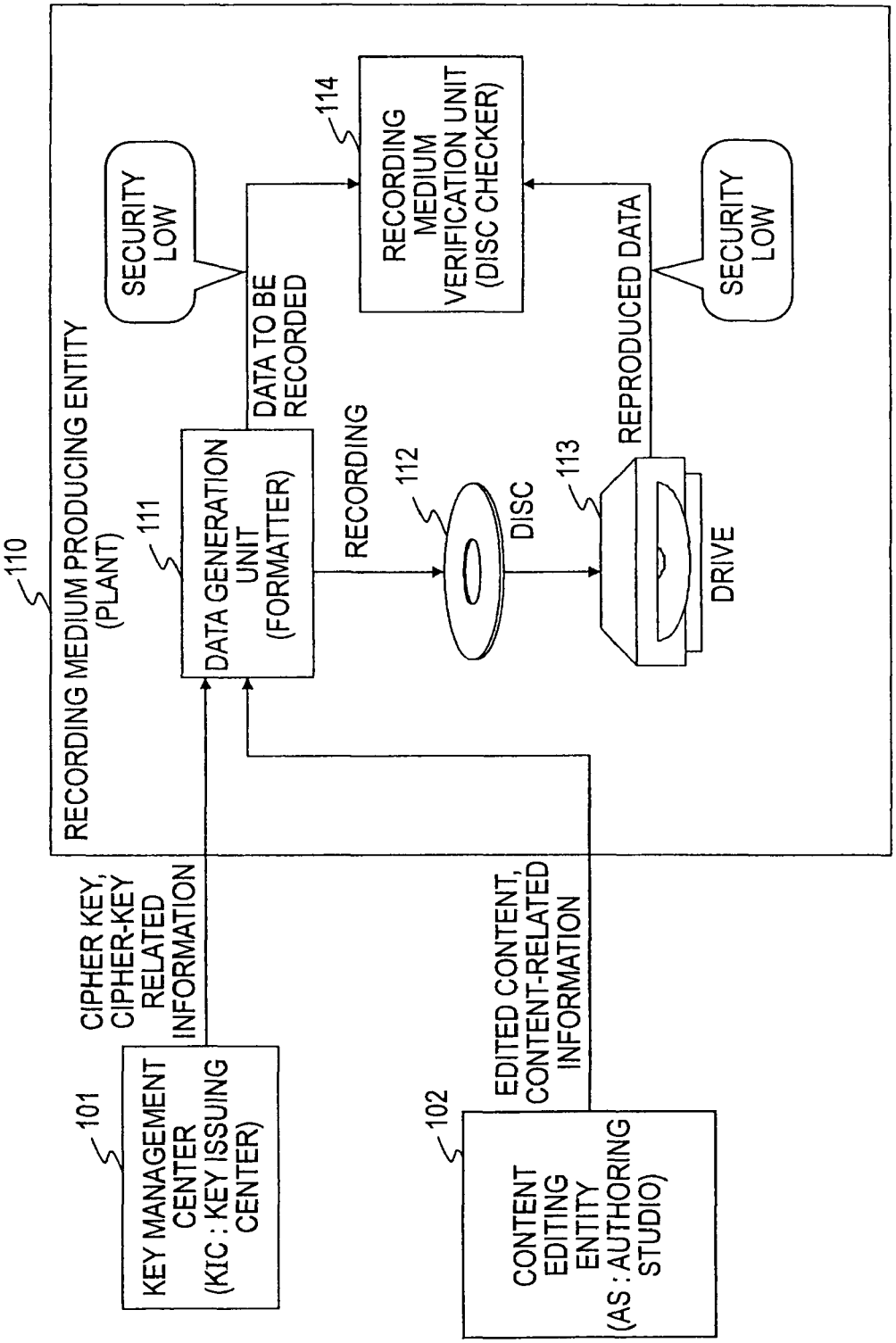
FIG. 1 is a block diagram of the structure of a conventional system for verifying data on an information recording medium.
Figure 2:
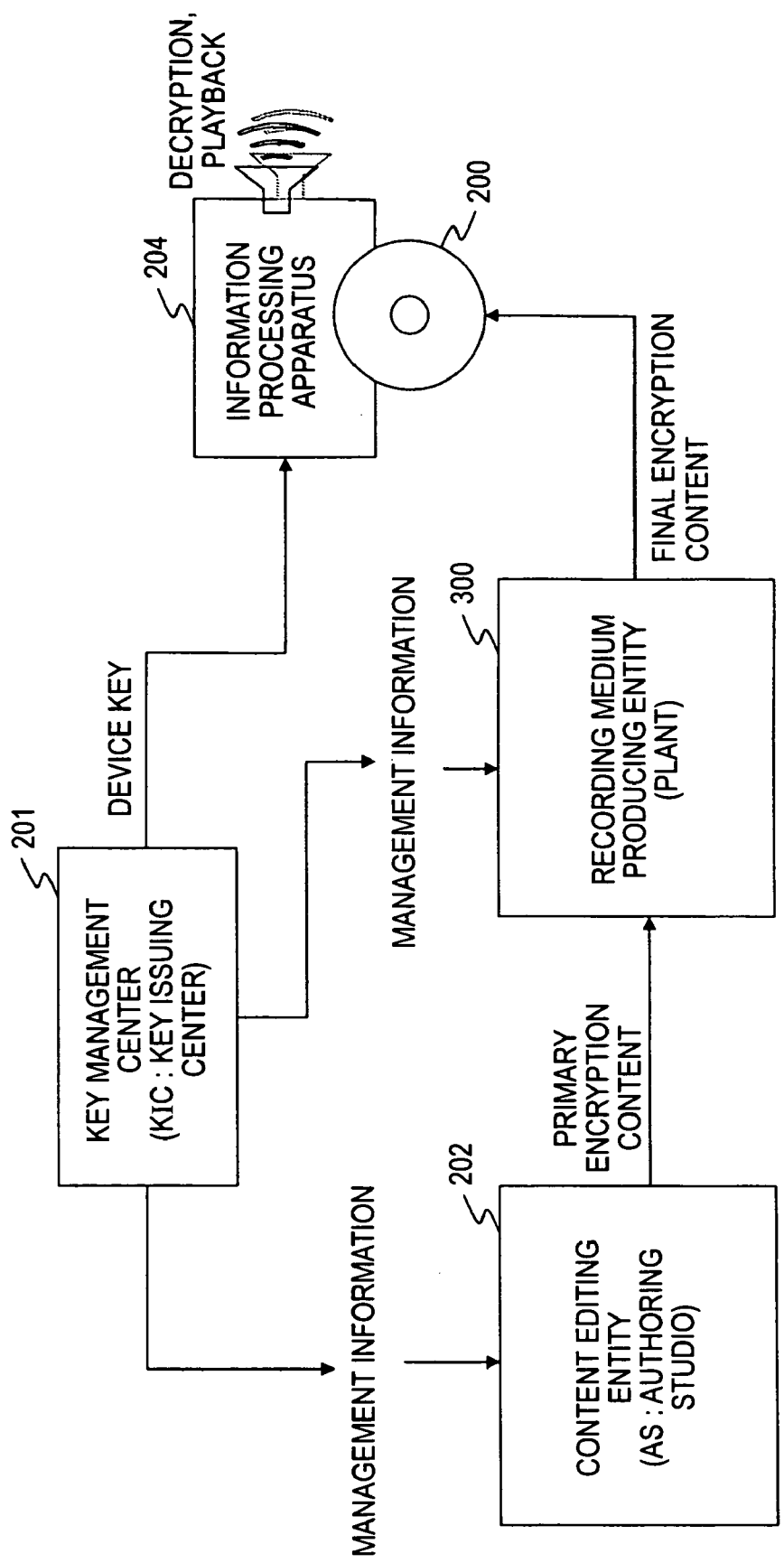
FIG. 2 is a diagram explaining a general route for producing an information recording medium and components of data supply.

Referring to FIG. 2, a content editing entity (Authoring Studio: AS) 202 edits content to be stored in an information recording medium. After that, a recording medium producing entity (Plant) 300 mass-produces copies (replicas) of the content as CDs or DVDs, serving as media to be provided to users, thus producing information recording media 200. The information recording media 200 are distributed to the users. Each information recording medium 200 is played by a user's information processing apparatus 204.

A key management center (Key Issuing Center: KIC) 201 issues and manages cipher keys used in disc production, disc sales, and disc usage, and key related information such as key generation information. The key management center 201 provides various management information to the content editing entity 202 and the recording medium producing entity 300. On the basis of the management information received from the key management center 201, the content editing entity 202 edits content and the recording medium producing entity 300 encrypts the content and stores data on an information recording medium. In addition, the key management center 201 manages and provides a cipher key (device key) used to decrypt the encrypted content stored in the information recording medium 200 through the user's information processing apparatus 204.

Figure 3:
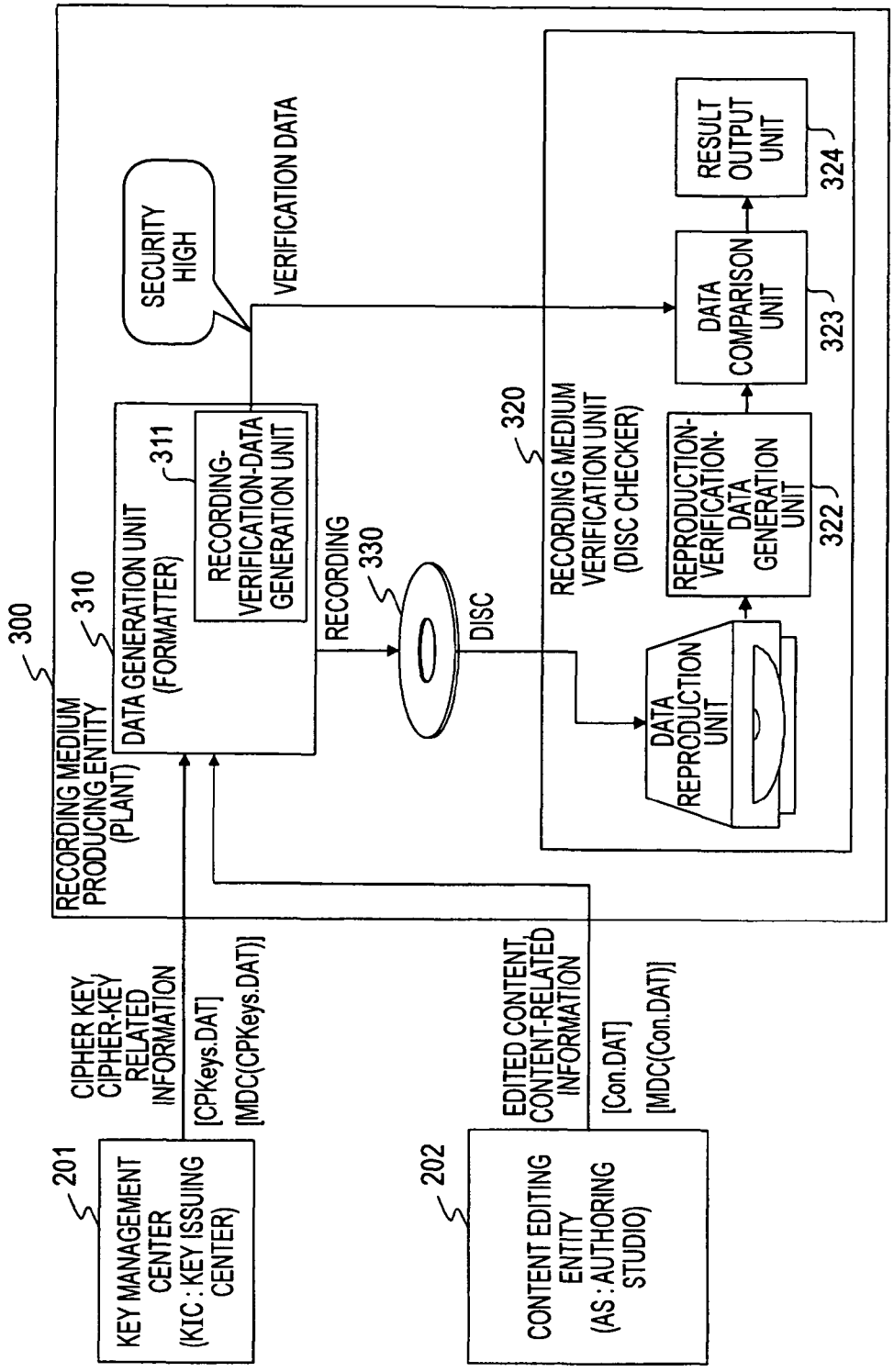
FIG. 3 is a block diagram of the structure of a system for verifying data on an information recording medium according to an embodiment of the present invention.

A process of verifying data on an information recording medium according to the present invention will now be described in detail with reference to FIG. 3. FIG. 3 shows the key management center 201 for executing a process of managing and issuing keys, the content editing entity 202, such as a studio, for executing a content editing process, and the recording medium producing entity 300 serving as a disc production plant. The recording medium producing entity 300 receives a cipher key and cipher-key related information, such as key generation information, from the key management center 201 and also receives edited content to be written on a disc and content-related information from the content editing entity 202.

Key related data, which is generated by the key management center 201 and is then provided to the recording medium producing entity 300, includes block key information (Renewal Key Block: RKB), a disc key (Kd) for a disc, other cipher keys, and key generation information. The block key information enables key acquisition based on the validity of a license related to a user device (information processing apparatus) according to an information distribution system with, e.g., a hierarchical tree structure. The above-mentioned key related data will be referred to as key information [CPKeys.DAT].

When providing the key information [CPKeys.DAT] to the recording medium producing entity 300, the key management center 201 adds a verification value to the key information [CPKeys.DAT]. The verification value is generated based on the key information [CPKeys.DAT] and is used to verify the key information [CPKeys.DAT] and check whether the key information [CPKeys.DAT] has been tampered with. For instance, a message digest code (MDC) is used as a verification value. The MDC is obtained by applying a one-way function (hash function) to component data of the key information [CPKeys.DAT]. For example, the SHA-1 hash function is used as a one-way function. The verification value will be designated by [MDC(CPKeys.DAT)].

In other words, the key management center 201 provides the key information [CPKeys.DAT] and the verification value [MDC(CPKeys.DAT)] to the recording medium producing entity 300.

The recording medium producing entity 300 calculates a new verification value [MDC'(CPKeys.DAT)] from the key information [CPKeys.DAT] received from the key management center 201 by using the one-way function such as SHA-1 and compares the calculated value with the received verification value [MDC(CPKeys.DAT)]. If the values coincides with each other, the recording medium producing entity 300 determines that the key information [CPKeys.DAT] received from the key management center 201 has not been tampered with, i.e., the information is valid.

In addition, the content editing entity 202 provides edited content to be written on a disc and content-related information to the recording medium producing entity 300. Data provided to the recording medium producing entity 300 by the content editing entity 202 includes content, such as moving image data, and control information for playback of the content. The edited content and the content-related information will be referred to as content information [Con.DAT]

When providing the content information [Con.DAT] to the recording medium producing entity 300, the content editing entity 202 adds a message digest code (MDC) as a verification value to the content information [Con.DAT]. The verification value serves as data to verify the content information [Con.DAT], i.e., check whether the content information [Con.DAT] has been tampered with. The verification value is obtained by applying a one-way function (hash function) similar to the foregoing function to the content information [Con.DAT]. The verification value will be designated by [MDC(Con.DAT)].

In other words, the content editing entity 202 provides the content information [Con.DAT] and the verification value [MDC(Con.DAT)] to the recording medium producing entity 300.

The recording medium producing entity 300 applies the one-way function such as SHA-1 to the content information [Con.DAT] received from the content editing entity 202 to obtain a new verification value [MDC'(Con.DAT)] and then compares the obtained value with the received verification value [MDC(Con.DAT)]. When the values coincide with each other, the recording medium producing entity 300 determines that the content information [Con.DAT] received from the content editing entity 202 has not been tampered with, i.e., the information is valid.

As mentioned above, the recording medium producing entity 300 verifies the information received from the key management center 201 and that received from the content editing entity 202 on the basis of the respective verification values. After that, the entity 300 records data on each disc 330.

In the above description, only the message digest code is used as a verification value. In addition, a digital signature can be set according to, e.g., a public key cryptosystem so that data is verified by signature verification.

The valid data checked by the above-mentioned verification process is supplied to a data generation unit (Formatter) 310 of the recording medium producing entity 300 in FIG. 3. In the data generation unit 310, for example, the content is encrypted using the key provided by the key management center 201, a data formatting process is executed, and data is written on each information recording medium 330 (disc). Not only the content but also various key information including the above-mentioned renewal key block (RKB) are written on the information recording medium 330.

In addition, the recording medium producing entity 300 executes a verification process of determining whether data recorded on each information recording medium 330 is valid. All recorded discs or sampled discs are subjected to the verification process.

The verification process is executed by a recording medium verification unit 320. The recording medium verification unit 320 includes a data reproduction unit 321, a reproduction-verification-data generation unit 322, a data comparison unit 323, and a result output unit 324.

The data reproduction unit 321 reproduces data recorded on the information recording medium 330. The reproduced data includes the content and key information to be verified. In other words, the reproduced data includes content information corresponding to the foregoing content information [Con.DAT] and key information corresponding to the key information [CPKeys.DAT].

The two data items included in the reproduced data will be referred to as reproduced encrypted content information [R-Enc_Con.DAT] and reproduced key information [R-CPKeys.DAT]. "R" indicates reproduced data and "Enc" denotes encrypted data. The data generation unit 310 encrypts the content and then records the encrypted content on the information recording medium 330. Data reproduced by the data reproduction unit (Drive) 321 is encrypted data. In some cases, there are many data items to be verified. In this case, the above-mentioned two data items will be simply described as data to be verified.

The reproduction-verification-data generation unit 322 receives the reproduced encrypted content information [R-Enc_Con.DAT] and the reproduced key information [R-CPKeys.DAT] from the data reproduction unit 321 and generates verification data.

The reproduction-verification-data generation unit 322 executes a calculation process based on the reproduced data to generate reproduction verification data. Specifically, for the reproduced encrypted content information [R-Enc_Con.DAT], the reproduction-verification-data generation unit 322 calculates a verification value [MDC(R-Enc_Con.DAT)] from the reproduced encrypted content information [R-Enc_Con.DAT] by using the one-way function such as SHA-1 and then outputs the calculated value as a content verification value to the data comparison unit 323. In addition, for the reproduced key information [R-CPKeys.DAT], the reproduction-verification-data generation unit 322 calculates a verification value [MDC(R-CPKeys.DAT)] from the reproduced key information [R-CPKeys.DAT] by using the one-way function such as SHA-1 and then outputs the calculated value as a key-information verification value to the data comparison unit 323.

The data comparison unit 323 executes a checking process of comparing each verification value supplied from the reproduction-verification-data generation unit 322 with the corresponding value supplied from a recording-verification-data generation unit 311 of the data generation unit 310.

In the data generation unit 310, the recording-verification-data generation unit 311 generates verification data based on information to be recorded on the information recording medium 330, i.e., encrypted content information [Enc_Con.DAT] to be recorded and the key information [CPKeys.DAT] to be recorded.

For the encrypted content information [Enc_Con.DAT] to be recorded, the recording-verification-data generation unit 311 applies the one-way function such as SHA-1 to the encrypted content information [Enc_Con.DAT] to be recorded, thus obtaining a verification value [MDC(Enc_Con.DAT)]. Then, the unit 311 outputs the obtained value as a content verification value to the data comparison unit 323. In addition, for the key information [CPKeys.DAT] to be recorded, the recording-verification-data generation unit 311 applies the one-way function such as SHA-1 to the key information [CPKeys.DAT] to be recorded, thus obtaining a verification value [MDC(CPKeys.DAT)]. The unit 311 then outputs the obtained value as a key-information verification value to the data comparison unit 323.

As mentioned above, the key management center 201 provides the key information [CPKeys.DAT] and the verification value [MDC(CPKeys.DAT)] to the recording medium producing entity 300. If the recording medium producing entity 300 already has the verification value [MDC(CPKeys.DAT)], the recording-verification-data generation unit 311 does not need to generate new verification data. The existing data can be supplied as the verification value to the data comparison unit 323.

The data comparison unit 323 executes the checking process of comparing each verification value supplied from the reproduction-verification-data generation unit 322 with the corresponding value supplied from the recording-verification-data generation unit 311 of the data generation unit 310.

In other words, for the content, the verification value [MDC(R-Enc_Con.DAT)] supplied from the reproduction-verification-data generation unit 322 is compared to the verification value [MDC(Enc_Con.DAT)] supplied from the recording-verification-data generation unit 311. If the values coincide with each other, the data comparison unit 323 determines that reproduced data coincides with data to be recorded and valid data is recorded and then outputs a result of the determination to the result output unit 324.

With regard to the key information, the data comparison unit 323 compares the verification value [MDC(R-CPKeys.DAT)] supplied from the reproduction-verification-data generation unit 322 with the verification value [MDC(CPKeys.DAT)] supplied from the recording-verification-data generation unit 311. If the values coincide with each other, the data comparison unit 323 determines that reproduced data coincides with data to be recorded and valid data is recorded. The data comparison unit 323 outputs a result of the determination to the result output unit 324.

In the structure according to the present embodiment, data which is transferred from the recording-verification-data generation unit 311 of the data generation unit 310 to the recording medium verification unit 320 through a data transfer path includes not content and key information but digest values calculated based on the content and the key information, i.e., MDCs (Message Digest Codes). If the MDC data is leaked, the content and the key information are not leaked. Therefore, there is no risk of leakage of data to be secured. In addition, as long as a transfer path from the data reproduction unit 321 to the data comparison unit 323 is closed so as to block access from the outside, data leakage is prevented. Consequently, data can be verified in a high security environment.

In the structure shown in FIG. 3 according to the embodiment, the recording medium verification unit 320 includes four components, i.e., the data reproduction unit 321, the reproduction-verification-data generation unit 322, the data comparison unit 323, and the result output unit 324. Output data of the reproduction-verification-data generation unit 322 is MDC data. If MDC data is leaked, it is no problem. As long as the path between the data reproduction unit 321 and the reproduction-verification-data generation unit 322 is protected against access from the outside, security is ensured. The reproduction-verification-data generation unit 322, the data comparison unit 323, and the result output unit 324 can be connected via a typical data transfer path similar to that in the connection between the recording-verification-data generation unit 311 and the data comparison unit 323.

According to a modification of the embodiment of the present invention, the system can be constructed such that a data reproduction unit in a recording medium verification unit executes not only a data reproduction process but also a data decryption process, and check data, based on decrypted data supplied from the data reproduction unit, serves as data to be compared. The modification will now be described with reference to FIG. 4.

Figure 4:
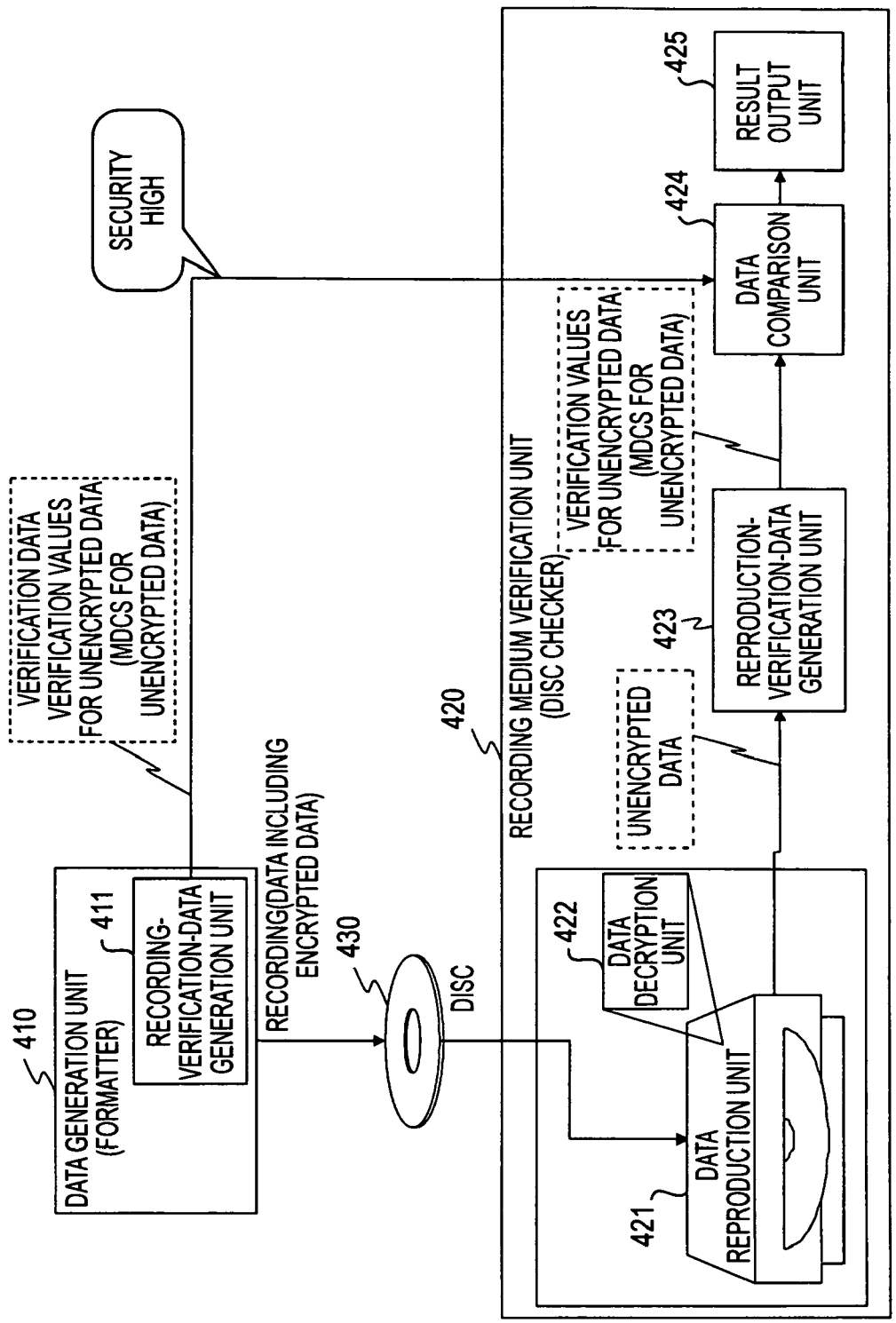
FIG. 4 is a block diagram of the structure of a system for verifying data on an information recording medium according to a modification of the embodiment.

Referring to FIG. 4, in a recording medium producing entity, a data generation unit (Formatter) 410 executes a content encryption process using a key provided by, e.g., a key management center and a data formatting process, thus recording data on an information recording medium (disc) 430. Content and various key information, such as a renewal key block (RKB) described above, are recorded on the information recording medium 430.

A recording medium verification unit 420 executes a data verification process. The recording medium verification unit 420 includes a data reproduction unit 421, a reproduction-verification-data generation unit 423, a comparison unit 424, and a result output unit 425.

The data reproduction unit (Drive) 421 has therein a data decryption unit 422 for executing a process of decrypting reproduced encrypted data. The data reproduction unit 421 reproduces data recorded on the information recording medium 430. The data decryption unit 422 decrypts the reproduced data which is encrypted and then outputs the decrypted data, i.e., unencrypted data to the reproduction-verification-data generation unit 423. Output data includes content and key information, which are subjected to the verification process, e.g., content information and key information.

The data reproduction unit 421 generates two output data items, i.e., reproduced content information [R-Con.DAT] and reproduced key information [R-CPKeys.DAT]. "R" means that it is reproduced data.

The reproduction-verification-data generation unit 423 receives the reproduced content information [R-Con.DAT] and the reproduced key information [R-CPKeys.DAT] and generates verification data.

The reproduction-verification-data generation unit 423 executes a calculation process based on the reproduced data to generate reproduction verification data. Specifically, the reproduction-verification-data generation unit 423 calculates a verification value [MDC(R-Con.DAT)] based on the reproduced content information [R-Con.DAT] by using the one-way function such as SHA-1 and then outputs the calculated value as a content verification value to the data comparison unit 424. In addition, the reproduction-verification-data generation unit 423 calculates a verification value [MDC(R-CPKeys.DAT)] from the reproduced key information [R-CPKeys.DAT] by using the one-way function such as SHA-1 and then outputs the calculated value as a key-information verification value to the data comparison unit 424.

The data comparison unit 424 executes a checking process of comparing each verification value supplied from the reproduction-verification-data generation unit 423 with the corresponding value supplied from a recording-verification-data generation unit 411 in the data generation unit 410.

The data generation unit 410 records encrypted content [Enc_Con.DAT] on the information recording medium 430. The recording-verification-data generation unit 411 generates verification data on the basis of unencrypted content information which is not yet encrypted.

The recording-verification-data generation unit 411 calculates a verification value [MDC(Con.DAT)] based on content information [Con.DAT] by using the one-way function such as SHA-1 and then outputs the calculated value as a content verification value to the data comparison unit 424. In addition, the recording-verification-data generation unit 411 calculates a verification value [MDC(CPKeys.DAT)] from key information [CPKeys.DAT] to be recorded by using the one-way function such as SHA-1 and then outputs the calculated value as a key-information verification value to the data comparison unit 424.

As mentioned above, the key management center and a content editing entity provide verification values (MDCs) regarding data to be provided in addition to the provided data to the recording medium producing entity. The recording-verification-data generation unit 411 can supply the provided verification values to the data comparison unit 424 without generating new verification data.

The data comparison unit 424 executes the checking process of comparing each verification value supplied from the reproduction-verification-data generation unit 423 with the corresponding value supplied from the recording-verification-data generation unit 411 of the data generation unit 410.

In other words, with regard to the content, the data comparison unit 424 compares the verification value [MDC(R-Con.DAT)] supplied from the reproduction-verification-data generation unit 423 with the verification value [MDC(Con.DAT)] supplied from the recording-verification-data generation unit 411. If the values coincide with each other, the data comparison unit 424 determines that reproduced data coincides with data to be recorded and valid data is recorded and then outputs the result of the determination to the result output unit 425.

In addition, for the key information, the data comparison unit 424 compares the verification value [MDC(R-CPKeys.DAT)] supplied from the reproduction-verification-data generation unit 423 with the verification value [MDC(CPKeys.DAT)] supplied from the recording-verification-data generation unit 411. If the values coincide with each other, the data comparison unit 424 determines that reproduced data coincides with data to be recorded and valid data is recorded and then outputs the result of the determination to the result output unit 425.

In the above structure according to the modification of the embodiment, data, which is transferred via a data transfer path between the recording-verification-data generation unit 411 of the data generation unit 410 to the recording medium verification unit 420, includes not content and key information but digest values, i.e., MDCs (message digest codes) calculated on the basis of the content and the key information. If the MDC data is leaked, the content and the key information are not leaked. Therefore, there is no risk of leakage of data to be secured. In addition, as long as a transfer path from the data reproduction unit 421 to the data comparison unit 424 is closed so as to block access from the outside, data leakage is prevented. Consequently, data can be verified in a high security environment.

In the structure shown in FIG. 4 according to the modification of the embodiment, the recording medium verification unit 420 includes four components, i.e., the data reproduction unit 421, the reproduction-verification-data generation unit 423, the data comparison unit 424, and the result output unit 425. Output data of the reproduction-verification-data generation unit 423 is MDC data. If MDC data is leaked, it is no problem. So long as the path between the data reproduction unit 421 and the reproduction-verification-data generation unit 423 is protected against access from the outside, security is maintained. The reproduction-verification-data generation unit 423, the data comparison unit 424, and the result output unit 425 can be connected via a typical data transfer path similar to that in the connection between the recording-verification-data generation unit 411 and the data comparison unit 424.

As mentioned above, the present invention has been described in detail with reference to the preferred embodiment. It should be understood that various modifications, combinations, sub-combinations and alterations could be made by those skilled in the art without departing from the spirit or scope of the invention. In other words, it is to be understood that the invention is not limited to the specific embodiment thereof except as defined in the appended claims.

A series of processes described in the specification can be executed by hardware, software, or the composition of them. When the processes are executed by software, a program including a process sequence can be installed on a memory in a computer integrated with special purpose hardware and be then executed. Alternatively, the program can be installed on a general-purpose computer capable of executing various processes and be then executed.

For example, the program can be previously recorded on a hard disk or a read-only memory (ROM) serving as a recording medium. Alternatively, the program can be temporarily or permanently stored (recorded) on a removable recording medium, such as a flexible disk, a compact disc read-only memory (CD-ROM), a magneto optical (MO) disk, a DVD, a magnetic disk, or a semiconductor memory. The removable recording medium can be provided as package software.

The program recorded on the above-mentioned removable recording medium can be installed on a computer. In addition, the program can be transferred from a download site to a computer by radio or via a network, such as a local area network (LAN) or the Internet. In the computer, the transferred program can be received and be installed on a recording medium such as a built-in hard disk.

Various processes described in the specification are executed on a time series basis in the order described above. The processes can also be executed simultaneously or individually as necessary or depending on the throughput of a system which executes the processes. In the specification, a system is a logical set of units. It is not necessarily that the units are included in the same casing.

What is claimed is:

1. A system for verifying data recorded on an information recording medium, the system comprising:
   a data generation unit configured to record the data on the information recording medium, and to output a first message digest code generated from the data;
   a data reproduction unit configured to reproduce the data that is recorded on the information recording medium, said data reproduction unit including a laser apparatus;
   a reproduction-verification-data generation unit configured to execute a calculation based on the data reproduced by the data reproduction unit to output a second message digest code; and
   a data comparison unit configured to receive the second message digest code output from the reproduction-verification-data generation unit and the first message digest code output from the data generation unit, and to compare the first message digest code with the second message digest code.

2. The system according to claim 1, wherein
   the reproduction-verification-data generation unit is configured to execute a calculation of applying a one-way function to the data reproduced from the information recording medium to output a result of the calculation as the second message digest code to the data comparison unit.

3. The system according to claim 1, wherein
the data reproduction unit is configured to output encrypted data stored in the information recording medium to the reproduction-verification-data generation unit, and
the reproduction-verification-data generation unit is configured to execute a calculation of applying a one-way function to the encrypted data to output a result of the calculation as the second message digest code to the data comparison unit.

4. The system according to claim 1, wherein
the data reproduction unit further includes a data decryption unit configured to decrypt encrypted data included in the data reproduced from the information recording medium,
the data reproduction unit is configured to output unencrypted data, which is decrypted by the data decryption unit, to the reproduction-verification-data generation unit, and
the reproduction-verification-data generation unit is configured to execute a calculation of applying a one-way function to the unencrypted data to output a result of the calculation as the second message digest code to the data comparison unit.

5. The system according to claim 1, wherein
the data reproduction unit is configured to reproduce data, including encrypted content and key information, from the information recording medium, and
the data comparison unit is configured to verify the content and the key information on the basis of verification data as a result of a calculation based on the encrypted content or decrypted content and verification data as a result of a calculation based on the key information.

6. A method for verifying data recorded on an information recording medium implemented by a recording medium reproducing system, the method comprising:
recording, at a data generation unit, the data on the information recording medium;
outputting, from the data generation unit, a first message digest code generated from the data;
reproducing, at a recording medium verification apparatus, data that is recorded on the information recording medium by using a laser device of the recording medium verification apparatus;
executing, with a processor at the recording medium verification apparatus, a calculation based on the reproduced data to generate and output a second message digest code;
receiving, a comparison unit, the first message digest code output from the data generation unit and the second message digest code output from the recording medium verification apparatus; and
comparing, with the comparison unit, the first message digest code with the second message digest code.

7. The method according to claim 6, wherein
the executing includes applying a one-way function to the data reproduced from the information recording medium to generate the second message digest code.

8. The method according to claim 6, wherein
the reproducing includes reproducing encrypted data stored in the information recording medium, and
the executing includes applying a one-way function to the encrypted data to generate the second message digest code.

9. The method according to claim 6, further comprising:
decrypting encrypted data included in the data reproduced from the information recording medium to generate unencrypted data, wherein
the executing includes applying a one-way function to the unencrypted data to generate the second message digest code.

10. The method according to claim 6, wherein
the reproducing includes reproducing encrypted content and key information from the information recording medium, and
the comparing includes verifying that the content and the key information on a basis of verification data as a result of a calculation based on the encrypted content or decrypted content and verification data as a result of a calculation based on the key information.

11. A computer readable storage medium encoded with instructions, which when executed by a recording medium reproducing system causes the recording medium reproducing system to implement a method for verifying data recorded on an information recording medium, the method comprising:
recording, at a data generation unit, the data on the information recording medium;
outputting, from the data generation unit, a first message digest code generated from the data;
reproducing, at a recording medium verification apparatus, data that is recorded on the information recording medium by using a laser device of the recording medium verification apparatus;
executing, with a processor at the recording medium verification apparatus, a calculation based on the reproduced data to generate and output a second message digest code;
receiving, a comparison unit, the first message digest code output from the data generation unit and the second message digest code output from the recording medium verification apparatus; and
comparing, with the comparison unit, the first message digest code with the second message digest code.

* * * * *